United States Patent
McNab (10) Patent No.: US 7,280,319 B1
(45) Date of Patent: Oct. 9, 2007

(54) SUSPENSION ASSEMBLY WITH PIEZOELECTRIC MICROACTUATORS ELECTRICALLY CONNECTED TO A FOLDED FLEX CIRCUIT SEGMENT

(75) Inventor: Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 441 days.

(21) Appl. No.: 11/047,400

(22) Filed: Jan. 31, 2005

(51) Int. Cl.
*G11B 5/44* (2006.01)

(52) U.S. Cl. .................................. 360/294.4

(58) Field of Classification Search ............. 360/294.4, 360/265.9
See application file for complete search history.

(56) References Cited

U.S. PATENT DOCUMENTS

| | | | |
|---|---|---|---|
| 4,188,645 | A | 2/1980 | Ragle et al. |
| 4,858,040 | A | 8/1989 | Hazebrouck |
| 5,189,578 | A | 2/1993 | Mori et al. |
| 5,282,190 | A | 1/1994 | Maruo et al. |
| 5,305,507 | A | 4/1994 | Dvorsky et al. |
| 5,400,192 | A | 3/1995 | Mizoshita et al. |
| 5,764,444 | A | 6/1998 | Imamura et al. |
| 5,894,651 | A | 4/1999 | Dvorsky et al. |
| 5,898,541 | A | 4/1999 | Boutaghou et al. |
| 5,920,145 | A | 7/1999 | Wu et al. |
| 6,046,888 | A | 4/2000 | Krinke et al. |
| 6,052,251 | A | 4/2000 | Mohajerani et al. |
| 6,108,175 | A | 8/2000 | Hawwa et al. |
| 6,157,522 | A | 12/2000 | Murphy et al. |
| 6,188,548 | B1 | 2/2001 | Khan et al. |
| 6,201,668 | B1 | 3/2001 | Murphy |
| 6,215,629 | B1 | 4/2001 | Kant et al. |
| 6,233,124 | B1 | 5/2001 | Budde et al. |
| 6,297,936 | B1 | 10/2001 | Kant et al. |
| 6,327,120 | B1 | 12/2001 | Koganezawa et al. |
| 6,331,923 | B1 | 12/2001 | Mei |
| 6,335,848 | B1 * | 1/2002 | Mei ........................ 360/294.4 |
| 6,335,849 | B1 | 1/2002 | Khan et al. |
| 6,362,542 | B1 | 3/2002 | Novotny |
| 6,376,964 | B1 | 4/2002 | Young et al. |
| 6,411,475 | B1 | 6/2002 | Khan et al. |
| 6,421,211 | B1 * | 7/2002 | Hawwa et al. ........... 360/294.4 |
| 6,456,464 | B1 | 9/2002 | Khan et al. |
| 6,487,055 | B1 | 11/2002 | Mei |
| 6,515,834 | B1 | 2/2003 | Murphy |
| 6,538,854 | B2 | 3/2003 | Koganezawa et al. |
| 6,617,763 | B2 | 9/2003 | Mita et al. |
| 6,653,761 | B2 | 11/2003 | Fujii et al. |

(Continued)

*Primary Examiner*—Tianjie Chen
(74) *Attorney, Agent, or Firm*—Stetina, Brunda, Garred & Brucker (57) ABSTRACT

A suspension assembly includes a load beam, a mount plate, first and second piezoelectric microactuators, and a flex circuit segment. The first piezoelectric microactuator is electrically non-conductively attached to the load beam and the mount plate. The first piezoelectric microactuator includes a first piezoelectric element, a first top electrode, and a first bottom electrode. The second piezoelectric microactuator is electrically non-conductively attached to the load beam and the mount plate. The second piezoelectric microactuator includes a second piezoelectric element, a second top electrode, and a second bottom electrode. The flex circuit segment is disposed folded about the first and second piezoelectric microactuators. The flex circuit segment is in electrical communication with the first top electrode, the first bottom electrode, the second top electrode, and the second bottom electrode.

27 Claims, 4 Drawing Sheets

U.S. PATENT DOCUMENTS

| | | |
|---|---|---|
| 6,653,763 B2 | 11/2003 | Wang et al. |
| 6,661,618 B2 * | 12/2003 | Fujiwara et al. ......... 360/294.4 |
| 6,661,619 B2 * | 12/2003 | Nishida et al. .......... 360/294.4 |
| 6,716,363 B1 | 4/2004 | Wright et al. |
| 6,760,181 B2 | 7/2004 | Li et al. |
| 6,760,196 B1 | 7/2004 | Niu et al. |
| 6,791,802 B2 * | 9/2004 | Watanabe et al. ........ 360/294.4 |
| 7,035,055 B2 * | 4/2006 | Kikkawa et al. ......... 360/265.9 |
| 2002/0089793 A1 * | 7/2002 | Nakagawa et al. ...... 360/294.4 |
| 2004/0070885 A1 | 4/2004 | Kikkawa et al. |
| 2004/0201925 A1 * | 10/2004 | Huha et al. ............... 360/294.4 |
| 2004/0201926 A1 | 10/2004 | Hancer et al. |
| 2005/0099736 A1 * | 5/2005 | Utsunomiya ............. 360/294.4 |

\* cited by examiner

SUSPENSION ASSEMBLY WITH PIEZOELECTRIC MICROACTUATORS ELECTRICALLY CONNECTED TO A FOLDED FLEX CIRCUIT SEGMENT

BACKGROUND OF THE INVENTION

1. Field of the Invention

The present invention relates generally to disk drives, and in particular to a disk drive suspension assembly with piezoelectric microactuators electrically connected to a folded flex circuit segment.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub.

The head stack assembly has an actuator assembly having at least one transducer head (typically a magneto-resistive or "MR" head), typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

Conductive traces (formed of copper for example) are laid on a dielectric layer (such as a polyimide film) formed on the head gimbal assembly. The dielectric layer electrically insulates the conductive traces from the gimbal (which may be formed of stainless steel for example). Such technologies are variously named TSA (Trace Suspension Assembly), NSL (No Service Loop), FOS (Flex On Suspension) and the like. These conductive traces interconnect the elements of the transducer head to drive a preamp and the circuits associated therewith.

A typical suspension assembly includes a load beam (also referred to as a "suspension") and a mount plate (also referred to as a "base plate," a "nut plate" or a "swage plate"). The mount plate is used to attach the load beam to the end of the actuator arms, typically through a swage engagement. The suspension assembly further includes the gimbal supported at the end of the load beam. A hinge plate may also be utilized which is interposed between the load beam and the mount plate. The suspension assembly with the slider attached to the gimbal is typically referred to as a head gimbal assembly.

The transducer head is disposed within the slider. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the slider and transmits the gram load biasing force to the slider to "load" the slider against the disk. A rapidly spinning disk develops a laminar airflow above its surface that lifts the slider including the head away from the disk in opposition to the gram load biasing force. The slider is said to be "flying" over the disk when in this state.

As disk drives have progressed to higher areal densities, the fly height and the fly height tolerances has been correspondingly reduced. As such, the ability to maintain the slider within such operational specifications has become increasingly difficult. Accordingly, there is a need in the art for a disk drive having an improved suspension assembly design in comparison to the prior art.

SUMMARY OF THE INVENTION

An aspect of the present invention can be regarded as a suspension assembly for use with a disk drive. The suspension assembly includes a load beam, a mount plate, first and second piezoelectric microactuators, and a flex circuit segment. The first piezoelectric microactuator is disposed between the load beam and the mount plate for pivoting the load beam relative to the mount plate. The first piezoelectric microactuator is electrically non-conductively attached to the load beam and the mount plate for electrically isolating the first piezoelectric microactuator from the load beam and the mount plate. The first piezoelectric microactuator includes a first piezoelectric element, a first top electrode disposed upon the first piezoelectric element, and a first bottom electrode disposed upon the first piezoelectric element opposite the first top electrode. The second piezoelectric microactuator is disposed between the load beam and the mount plate for pivoting the load beam relative to the mount plate. The second piezoelectric microactuator is electrically non-conductively attached to the load beam and the mount plate for electrically isolating the second piezoelectric microactuator from the load beam and the mount plate. The second piezoelectric microactuator includes a second piezoelectric element, a second top electrode disposed upon the second piezoelectric element, and a second bottom electrode disposed upon the second piezoelectric element opposite the second top electrode. The flex circuit segment is disposed folded about the first and second piezoelectric microactuators. The flex circuit segment is in electrical communication with the first top electrode, the first bottom electrode, the second top electrode, and the second bottom electrode.

According to various embodiments, the first and second piezoelectric microactuators may be electrically non-conductively attached to the load beam and the mount plate with non-conductive adhesive. The first and second piezoelectric elements may each have opposing first and second ends. The first ends may each be respectively electrically non-conductively attached to the load beam, and the second ends may each be respectively electrically non-conductively attached to the mount plate. The first ends may each be respectively electrically non-conductively attached to the load beam with non-conductive adhesive, and the second ends may each be respectively electrically non-conductively attached to the mount plate with non-conductive adhesive. The first and second bottom electrodes may be disposed between the load beam and the mount plate without being in electrical contact with the load beam and the mount plate. The suspension assembly may further include a flex circuit assembly with a head trace segment disposed along the load beam. The flex circuit segment may be integrally formed with the flex circuit assembly. The flex circuit segment may include a first, second and third traces electrically connected to the first and second piezoelectric microactuators. The first trace may be electrically connected to the first top electrode, the second trace may be electrically connected to the second top electrode and the first bottom electrode, and the third trace may be electrically connected to the second bottom electrode.

According to another aspect of the present invention, there is provided a head stack assembly for use with a disk drive. The head stack assembly includes an actuator arm and a suspension assembly attached to the actuator arm. The suspension assembly is as described above. According to another aspect of the present invention, there is provided a disk drive. The disk drive includes a disk drive base and a head stack assembly rotatably coupled to the disk drive base. The head stack assembly is as described above.

DESCRIPTION OF THE PREFERRED EMBODIMENTS

Referring now to the drawings wherein the showings are for purposes of illustrating preferred embodiments of the present invention only, and not for purposes of limiting the same, FIGS. 1-7 illustrate a disk drive and a suspension assembly in accordance with the aspects of the present invention.

Figure 1:
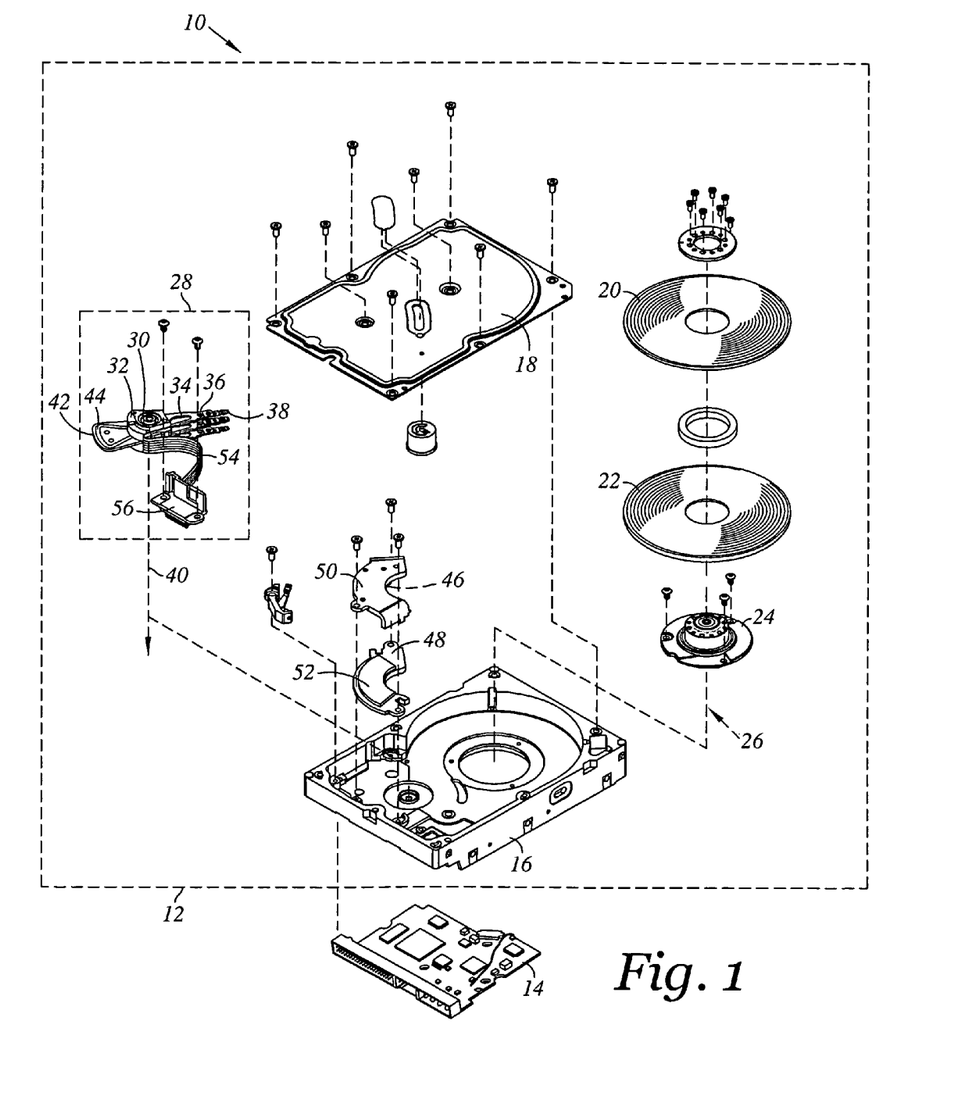
FIG. 1 is an exploded perspective view of a disk drive in accordance with the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing with a disk drive base 16 and a cover 18.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data.

The head disk assembly 12 further includes a spindle motor 24 for rotating the disks 20, 22 about an axis of rotation 26. The head disk assembly 12 further includes a head stack assembly 28 rotatably attached to the disk drive base 16 in operable communication with the disks 20, 22. The head stack assembly 28 includes a rotary actuator 30. In the embodiment shown, the actuator 30 includes an actuator body 32 and actuator arms (the uppermost one denoted 34) that extend from the actuator body 32. Distally attached to each of the actuator arms 34 is a suspension assembly (the uppermost one denoted 36). Each suspension assembly 36 respectively supports a slider (the uppermost one denoted 38). Each of the sliders 38 includes a transducer head. The suspension assemblies 36 with the sliders 38 are referred to as head gimbal assemblies. It is contemplated that the number of actuator arms and suspension assemblies may vary depending upon the number of disks and disk surfaces utilized.

The actuator body 32 includes a bore, and the actuator 30 further includes a pivot bearing cartridge engaged within the bore for facilitating the actuator body 32 to rotate between limited positions about an actuator axis of rotation 40. The actuator 30 further includes a coil support 42 that extends from one side of the actuator body 32 opposite the actuator arms 40. In this embodiment, the coil support 42 is configured to support a coil 44. A pair of magnetic elements 46, 48 is supported by mounts 50, 52 which are attached to the disk drive base 16 (magnetic element 46 is indicated by the dashed lead line and it is understood that the magnetic element 46 is disposed underneath the mount 50). The coil 44 interacts with the magnetic elements 46, 48 to form a voice coil motor for controllably rotating the actuator 30.

The head stack assembly 28 further includes a flex circuit assembly 54 and a cable connector 56. The cable connector 56 is attached to the disk drive base 16 and is disposed in electrical communication with the printed circuit board 14. The flex circuit assembly 54 supplies current to the actuator coil 44 and carries signals between the transducer heads of the sliders 38 and the printed circuit board assembly 14.

Figures 2, 3, 4:
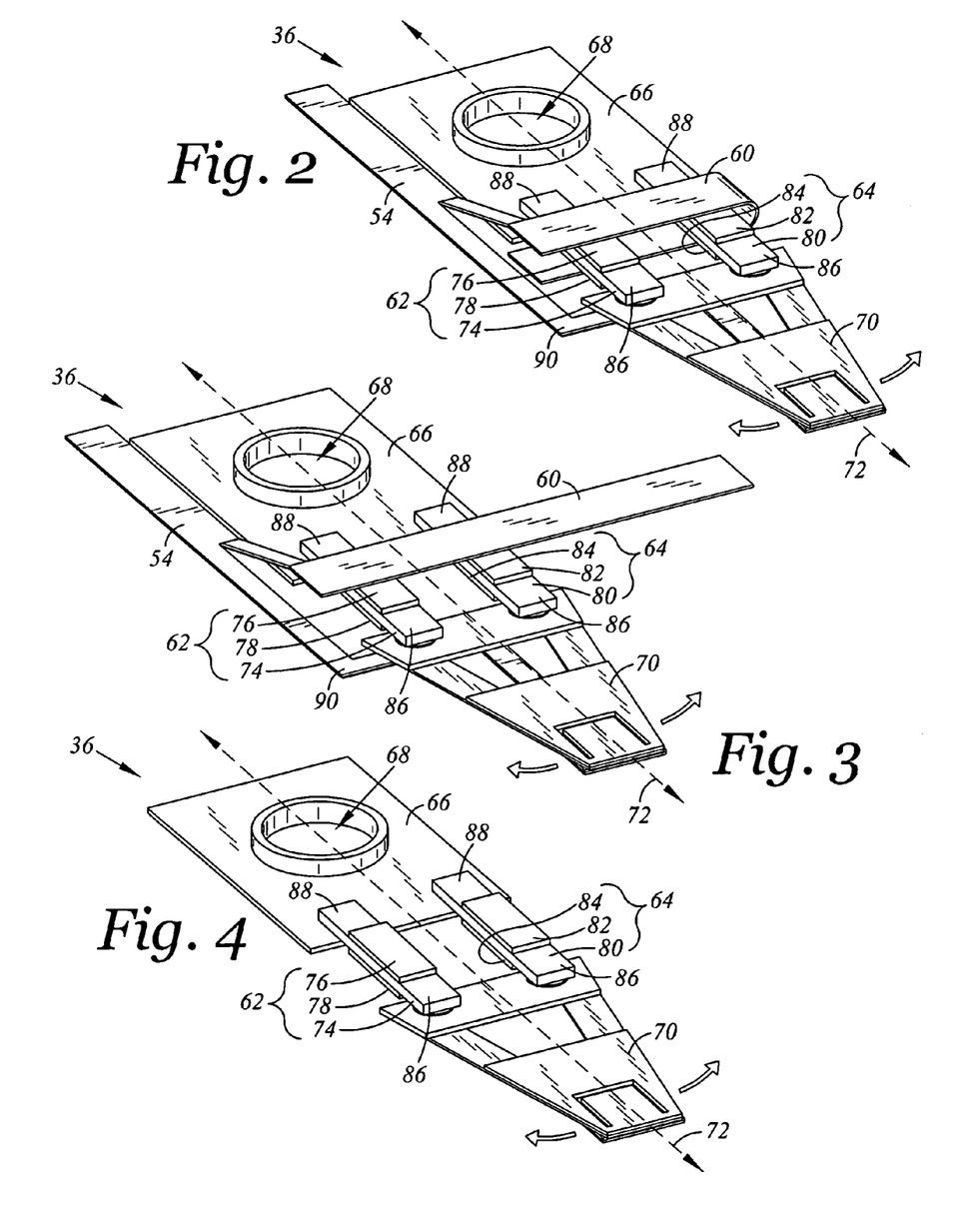
FIG. 2 is an enlarged top perspective view of a suspension assembly of the disk drive of FIG. 1 including a flex circuit segment and piezoelectric micro actuators in accordance with an aspect of the present invention.
FIG. 3 is the enlarged top perspective view of the suspension assembly of FIG. 2 as shown with the flex circuit segment in an unfolded position.
FIG. 4 is the enlarged top perspective view of the suspension assembly of FIG. 2 as shown without the flex circuit segment.
Figure 5:
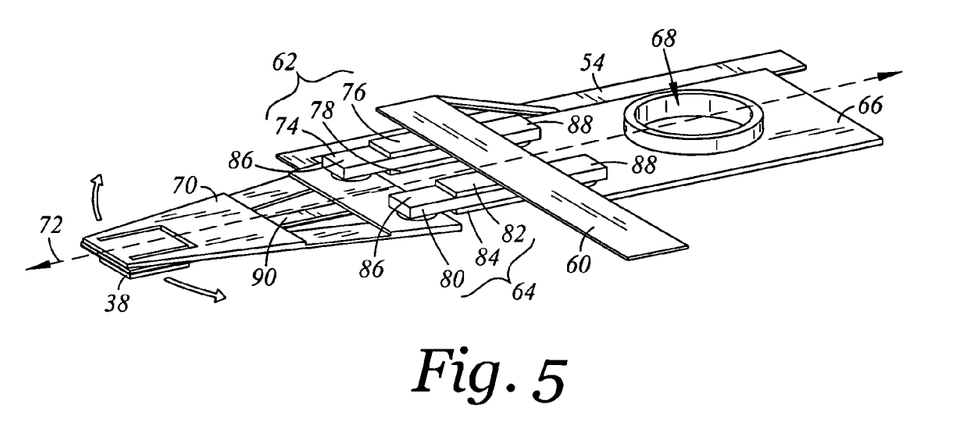
FIG. 5 is an enlarged top perspective view of the suspension assembly of FIG. 2 as seen from another viewing angle.
Figures 6, 7:
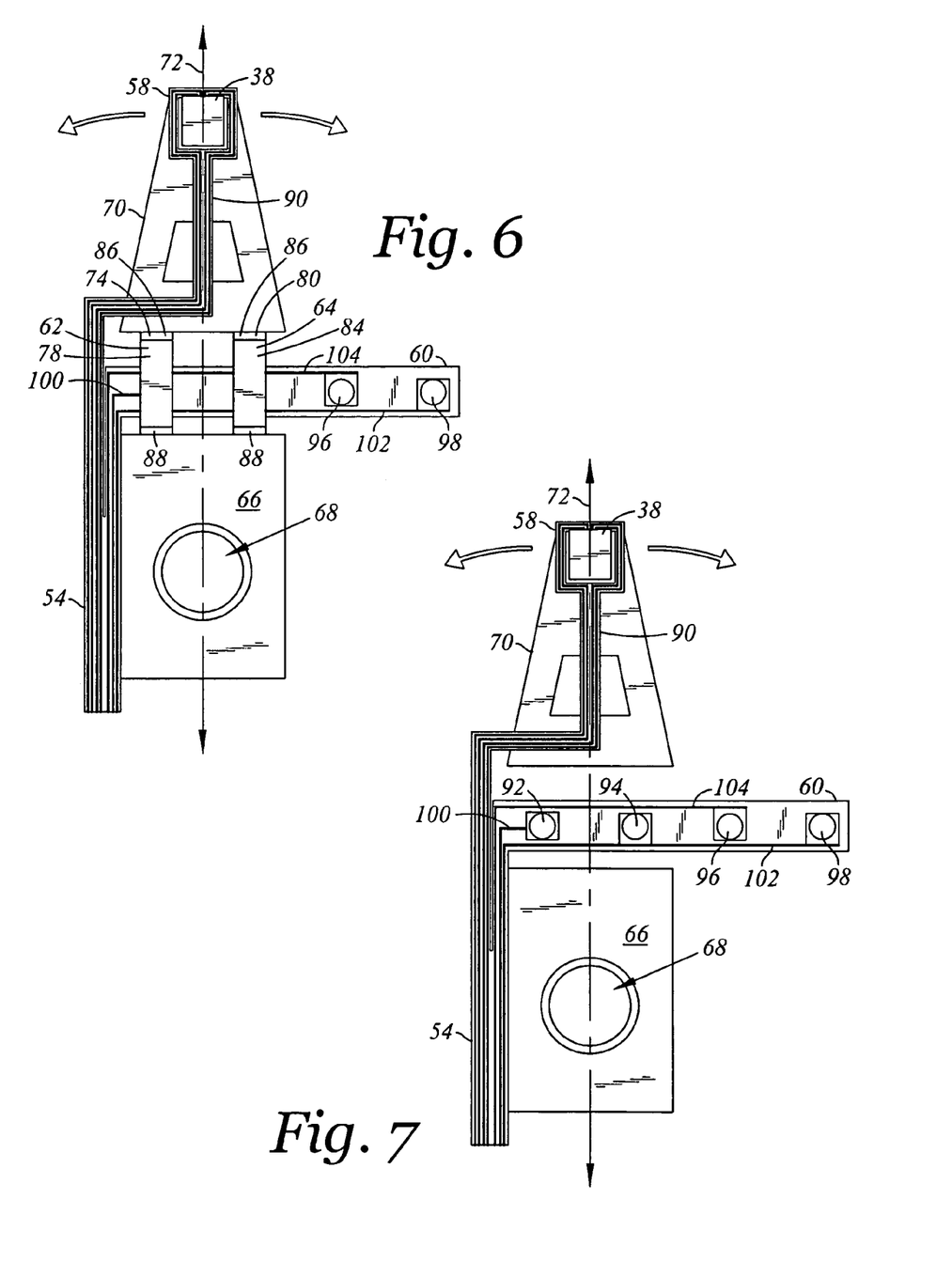
FIG. 6 is a bottom plan view of the suspension assembly of FIG. 3.
FIG. 7 is the bottom plan view of the suspension assembly of FIG. 6, however, as shown without the piezoelectric microactuators.

Referring now to FIG. 2, there is depicted an enlarged top perspective view of the suspension assembly 36 of the disk drive 10 of FIG. 1. Also shown is a portion the flex circuit assembly 54. The flex circuit assembly 54 includes electrical traces 58 for connection with the slider 38. As is discussed in detail below, the suspension assembly 36 of the present invention includes a flex circuit segment 60 and first and second piezoelectric microactuators 62, 64 in accordance with an aspect of the present invention. FIG. 3 is the enlarged top perspective view of the suspension assembly 36 of FIG. 2 as shown with the flex circuit segment 60 in an unfolded position. For ease of viewing the first and second piezoelectric microactuators 62, 64, FIG. 4 is the enlarged top perspective view of the suspension assembly 36 of FIG. 2 as shown without the flex circuit segment 60. FIG. 5 is an enlarged top perspective view of the suspension assembly 36 of FIG. 2 as seen from another viewing angle. FIG. 6 is a bottom plan view of the suspension assembly 36 of FIG. 3. Finally, for ease of viewing the flex circuit segment 60, FIG.

7 is the bottom plan view of the suspension assembly 36 of FIG. 6, however, as shown without the first and second piezoelectric microactuators 62, 64.

The suspension assembly 36 includes a mount plate 66. The mount plate 66 is used to attach the suspension assembly 36 to the actuator arm 34. The mount plate 66 may include a swage opening 68 that is utilized to attach the mount plate 66 to the actuator arm 34 via a swaging operation.

The suspension assembly includes a load beam 70. The slider 38 is coupled to the load beam 70. The mount plate 66 defines a longitudinal axis 72. As discussed below, the first and second piezoelectric microactuators 62, 64 are selectively actuated to pivot the load beam and therefore the slider 38 with respect to the longitudinal axis 72 as indicated be the arced lined arrows. As such, the first and second piezoelectric microactuators 62, 64 are utilized to move the slider 38 relative to the actuator arm 34 for secondary controlled positioning of the slider 38 with respect to tracks disposed upon the disk 20.

An aspect of the present invention can be regarded as a suspension assembly 36 for use with the disk drive 10. The suspension assembly 36 includes the load beam 70, the mount plate 66, the first and second piezoelectric microactuators 62, 64, and the flex circuit segment 60.

The first piezoelectric microactuator 62 is disposed between the load beam 70 and the mount plate 66 for pivoting the load beam 70 relative to the mount plate 66. The first piezoelectric microactuator 62 is electrically non-conductively attached to the load beam 70 and the mount plate 66 for electrically isolating the first piezoelectric microactuator 62 from the load beam 70 and the mount plate 66. The first piezoelectric microactuator 62 includes a first piezoelectric element 74, a first top electrode 76 disposed upon the first piezoelectric element 74, and a first bottom electrode 78 disposed upon the first piezoelectric element 74 opposite the first top electrode 76.

The second piezoelectric microactuator 64 is disposed between the load beam 70 and the mount plate 66 for pivoting the load beam 70 relative to the mount plate 66. The second piezoelectric microactuator 64 is electrically non-conductively attached to the load beam 70 and the mount plate 66 for electrically isolating the second piezoelectric microactuator 64 from the load beam 70 and the mount plate 66. The second piezoelectric microactuator 64 includes a second piezoelectric element 80, a second top electrode 82 disposed upon the second piezoelectric element 80, and a second bottom electrode 84 disposed upon the second piezoelectric element 80 opposite the second top electrode 82.

The flex circuit segment 60 is disposed folded about the first and second piezoelectric microactuators 62, 64 as shown in the embodiment of FIG. 2. The flex circuit segment 60 is in electrical communication with the first top electrode 76, the first bottom electrode 78, the second top electrode 82, and the second bottom electrode 84.

In further detail, the first and second piezoelectric microactuators 62, 64 are formed to deform in response to changes in electrical input respectively across the first and second piezoelectric elements 74, 80. In the particular embodiment shown, the first and second piezoelectric microactuators 62, 64 take the form of elongate rectangular structures that are generally aligned with the longitudinal axis 72. The first and second piezoelectric microactuators 62, 64 are configured to longitudinally expand and/or contract in response to changes in electrical input respectively across the first and second piezoelectric elements 74, 80. It is contemplated that the first and second piezoelectric microactuators 62, 64 may be constructed according to those techniques which are well known to one of ordinary skill in the art.

According to various embodiments, the first and second piezoelectric microactuators 62, 64 may be electrically non-conductively attached to the load beam 70 and the mount plate 66 with non-conductive adhesive. The first and second piezoelectric elements 74, 80 may each have opposing first and second ends 86, 88. The first ends 86 may each be respectively electrically non-conductively attached to the load beam 70, and the second ends 88 may each be respectively electrically non-conductively attached to the mount plate 66. The first ends 86 may each be respectively electrically non-conductively attached to the load beam 70 with non-conductive adhesive, and the second ends 88 may each be respectively electrically non-conductively attached to the mount plate 66 with non-conductive adhesive. Though not shown, it is contemplated that the first and second bottom electrodes 78, 84 may each be respectively electrically non-conductively attached to the mount plate 66 with non-conductive adhesive.

In the embodiment shown, the first and second bottom electrodes 78, 84 are disposed between the load beam 70 and the mount plate 66 without being in electrical contact with the load beam 70 and the mount plate 66. In this regard, the first and second bottom electrodes may be formed to extend only along a central portion of the first and second piezoelectric elements 74, 80. The first and second bottom electrodes 78, 84 may be formed using a deposition technique that involves masking the first and second ends 86, 88 of the first and second piezoelectric elements 74, 80.

The flex circuit assembly 54 may include a head trace segment 90 disposed along the load beam 70. The head trace segment 90 is disposed in electrical communication with the slider 38. It is contemplated that the flex circuit assembly 54 may include a trace suspension assembly backing layer with a gimbal configured to support the slider 38. The traces 58 (which may be formed of copper for example) are laid on a dielectric layer (such as a polyimide film). The dielectric layer may be formed on the trace suspension assembly backing layer. The dielectric layer electrically insulates the traces 58.

The flex circuit segment 60 may be integrally formed with the flex circuit assembly 54 as shown. However, it is contemplated that the flex circuit segment 60 may be separately formed from the flex circuit assembly 54 and subsequently electrically connected thereto.

The flex circuit segment 60 may include first, second and third traces 100, 102, 104 electrically connected to the first and second piezoelectric microactuators 62, 64. The first trace 100 may be electrically connected to the first top electrode 76, the second trace 102 may be electrically connected to the second top electrode 82 and the first bottom electrode 78, and the third trace 104 may be electrically connected to the second bottom electrode 84.

As such, it is recognized that only three traces need be utilized to service the four electrodes with a common trace between the first and second piezoelectric microactuators 62, 64. This is because the first and second piezoelectric elements 74, 80 are actuated by changes in the electrical input across the element 74, 80 (e.g., change in voltage potential). It is further recognized that even just two traces could be used to service the four electrodes. In addition, there may be a one to one correspondence of the traces to the electrodes.

The flex circuit segment 60 may include pads 92, 94, 96, 98 which are used to respectively electrically connect to the first top electrode 76, the second top electrode 82, the second bottom electrode 84, and the first bottom electrode 78. Trace 100 is electrically connected to pad 92. Trace 102 is electrically connected to pads 94, 98. Trace 104 is electrically connected to pad 96.

It is contemplated that the folded configuration of the flex circuit segment 60 facilitates an efficient method of electrically connecting to the first and second piezoelectric microactuators 62, 64. In this regard, the disposition of the electrodes 76, 78, 82, 84 upon the respective opposing planar surfaces of the first and second piezoelectric elements 74, 80 facilitates the readily accessible nature of the electrodes 76, 78, 82, 84 by the flex circuit segment 60 in the folded configuration. Moreover, the folded configuration of the flex circuit segment 60 allows use of a single piece of flex circuit material to facilitate such electrical connections.

According to another aspect of the present invention, there is provided the head stack assembly 28 for use with the disk drive 10. The head stack assembly 28 includes the actuator arm 34 and the suspension assembly 36 attached to the actuator arm 34. The suspension assembly 36 is as described above. According to yet another aspect of the present invention, there is provided the disk drive 10. The disk drive 10 includes the disk drive base 16 and the head stack assembly 28 rotatably coupled to the disk drive base 16. The head stack assembly 28 is as described above.

I claim:

1. A suspension assembly for use with a disk drive, the suspension assembly comprising:
    a load beam;
    a mount plate;
    a first piezoelectric microactuator disposed between the load beam and the mount plate for pivoting the load beam relative to the mount plate, the first piezoelectric microactuator being electrically non-conductively attached to the load beam and the mount plate for electrically isolating the first piezoelectric microactuator from the load beam and the mount plate, the first piezoelectric microactuator including a first piezoelectric element, a first top electrode disposed upon the first piezoelectric element, and a first bottom electrode disposed upon the first piezoelectric element opposite the first top electrode;
    a second piezoelectric microactuator disposed between the load beam and the mount plate for pivoting the load beam relative to the mount plate, the second piezoelectric microactuator being electrically non-conductively attached to the load beam and the mount plate for electrically isolating the second piezoelectric microactuator from the load beam and the mount plate, the second piezoelectric microactuator including a second piezoelectric element, a second top electrode disposed upon the second piezoelectric element, and a second bottom electrode disposed upon the second piezoelectric element opposite the second top electrode; and
    the first and second piezoelectric microactuators being at least partially enclosed by a folded flex circuit segment, the flex circuit segment being in electrical communication with the first top electrode, the first bottom electrode, the second top electrode, and the second bottom electrode.

2. The suspension assembly of claim 1 wherein the first and second piezoelectric microactuators are electrically non-conductively attached to the load beam and the mount plate with non-conductive adhesive.

3. The suspension assembly of claim 1 wherein the first and second piezoelectric elements each have opposing first and second ends, the first ends are each respectively electrically non-conductively attached to the load beam, the second ends are each respectively electrically non-conductively attached to the mount plate.

4. The suspension assembly of claim 3 wherein the first ends are each respectively electrically non-conductively attached to the load beam with non-conductive adhesive, the second ends are each respectively electrically non-conductively attached to the mount plate with non-conductive adhesive.

5. The suspension assembly of claim 1 wherein the first and second bottom electrodes are disposed between the load beam and the mount plate without being in electrical contact with the load beam and the mount plate.

6. The suspension assembly of claim 1 further includes a flex circuit assembly with a head trace segment disposed along the load beam.

7. The suspension assembly of claim 6 wherein the flex circuit segment is integrally formed with the flex circuit assembly.

8. The suspension assembly of claim 1 wherein the flex circuit segment includes first, second, and third traces electrically connected to the first and second piezoelectric microactuators.

9. The suspension assembly of claim 8 wherein the first trace is electrically connected to the first top electrode, the second trace is electrically connected to the second top electrode and the first bottom electrode, the third trace is electrically connected to the second bottom electrode.

10. A head stack assembly for use with a disk drive, the head stack assembly comprising:
    an actuator arm; and
    a suspension assembly attached to the actuator arm, the suspension assembly including:
        a load beam;
        a mount plate coupled to the actuator arm;
        a first piezoelectric microactuator disposed between the load beam and the mount plate for pivoting the load beam relative to the mount plate, the first piezoelectric microactuator being electrically non-conductively attached to the load beam and the mount plate for electrically isolating the first piezoelectric microactuator from the load beam and the mount plate, the first piezoelectric microactuator including a first piezoelectric element, a first top electrode disposed upon the first piezoelectric element, and a first bottom electrode disposed upon the first piezoelectric element opposite the first top electrode;
        a second piezoelectric microactuator disposed between the load beam and the mount plate for pivoting the load beam relative to the mount plate, the second piezoelectric microactuator being electrically non-conductively attached to the load beam and the mount plate for electrically isolating the second piezoelectric microactuator from the load beam and the mount plate, the second piezoelectric microactuator including a second piezoelectric element, a second top electrode disposed upon the second piezoelectric element, and a second bottom electrode disposed upon the second piezoelectric element opposite the second top electrode; and
        the first and second piezoelectric microactuators being at least partially enclosed by a folded flex circuit segment, the flex circuit segment being in electrical communication with the first top electrode, the first bottom electrode, the second top electrode, and the second bottom electrode.

11. The head stack assembly of claim 10 wherein the first and second piezoelectric microactuators are electrically non-conductively attached to the load beam and the mount plate with non-conductive adhesive.

12. The head stack assembly of claim 10 wherein the first and second piezoelectric elements each have opposing first and second ends, the first ends are each respectively electrically non-conductively attached to the load beam, the second ends are each respectively electrically non-conductively attached to the mount plate.

13. The head stack assembly of claim 12 wherein the first ends are each respectively electrically non-conductively attached to the load beam with non-conductive adhesive, the second ends are each respectively electrically non-conductively attached to the mount plate with non-conductive adhesive.

14. The head stack assembly of claim 10 wherein the first and second bottom electrodes are disposed between the load beam and the mount plate without being in electrical contact with the load beam and the mount plate.

15. The head stack assembly of claim 10 further includes a slider supported by the load beam and a flex circuit assembly with a head trace segment disposed along the load beam in electrical communication with the slider.

16. The head stack assembly of claim 15 wherein the flex circuit segment is integrally formed with the flex circuit assembly.

17. The head stack assembly of claim 10 wherein the flex circuit segment includes first, second, and third traces electrically connected to the first and second piezoelectric microactuators.

18. The head stack assembly of claim 17 wherein the first trace is electrically connected to the first top electrode, the second trace is electrically connected to the second top electrode and the first bottom electrode, the third trace is electrically connected to the second bottom electrode.

19. A disk drive comprising:
a disk drive base; and
a head stack assembly rotatably coupled to the disk drive base, the head stack assembly including an actuator arm and a suspension assembly attached to the actuator arm, the suspension assembly including:
a load beam;
a mount plate coupled to the actuator arm;
a first piezoelectric microactuator disposed between the load beam and the mount plate for pivoting the load beam relative to the mount plate, the first piezoelectric microactuator being electrically non-conductively attached to the load beam and the mount plate for electrically isolating the first piezoelectric microactuator from the load beam and the mount plate, the first piezoelectric microactuator including a first piezoelectric element, a first top electrode disposed upon the first piezoelectric element, and a first bottom electrode disposed upon the first piezoelectric element opposite the first top electrode;
a second piezoelectric microactuator disposed between the load beam and the mount plate for pivoting the load beam relative to the mount plate, the second piezoelectric microactuator being electrically non-conductively attached to the load beam and the mount plate for electrically isolating the second piezoelectric microactuator from the load beam and the mount plate, the second piezoelectric microactuator including a second piezoelectric element, a second top electrode disposed upon the second piezoelectric element, and a second bottom electrode disposed upon the second piezoelectric element opposite the second top electrode; and
the first and second piezoelectric microactuators being at least partially enclosed by a folded flex circuit segment, the flex circuit segment being in electrical communication with the first top electrode, the first bottom electrode, the second top electrode, and the second bottom electrode.

20. The disk drive of claim 19 wherein the first and second piezoelectric microactuators are electrically non-conductively attached to the load beam and the mount plate with non-conductive adhesive.

21. The disk drive of claim 19 wherein the first and second piezoelectric elements each have opposing first and second ends, the first ends are each respectively electrically non-conductively attached to the load beam, the second ends are each respectively electrically non-conductively attached to the mount plate.

22. The disk drive of claim 21 wherein the first ends are each respectively electrically non-conductively attached to the load beam with non-conductive adhesive, the second ends are each respectively electrically non-conductively attached to the mount plate with non-conductive adhesive.

23. The disk drive of claim 19 wherein the first and second bottom electrodes are disposed between the load beam and the mount plate without being in electrical contact with the load beam and the mount plate.

24. The disk drive of claim 19 wherein the head stack assembly further includes a slider supported by the load beam, the head stack assembly further includes a flex circuit assembly with a head trace segment disposed along the load beam in electrical communication with the slider.

25. The disk drive of claim 24 wherein the flex circuit segment is integrally formed with the flex circuit assembly.

26. The disk drive of claim 19 wherein the flex circuit segment includes first, second, and third traces electrically connected to the first and second piezoelectric microactuators.

27. The disk drive of claim 26 wherein the first trace is electrically connected to the first top electrode, the second trace is electrically connected to the second top electrode and the first bottom electrode, the third trace is electrically connected to the second bottom electrode.

* * * * *